United States Patent
Schober et al.

(10) Patent No.: US 8,854,146 B2
(45) Date of Patent: Oct. 7, 2014

(54) SYSTEMS AND METHODS FOR EXTERNAL FRIT MOUNTED COMPONENTS

(75) Inventors: Christina Marie Schober, St. Anthony, MN (US); Jennifer S. Strabley, Maple Grove, MN (US); Bernard Fritz, Eagan, MN (US); James A. Vescera, Hopkins, MN (US); Kenneth Salit, Plymouth, MN (US); Delmer L. Smith, Edina, MN (US); Terry Dean Stark, St. Louis Park, MN (US)

(73) Assignee: Honeywell International Inc., Morristown, NJ (US)

(*) Notice: Subject to any disclaimer, the term of this patent is extended or adjusted under 35 U.S.C. 154(b) by 138 days.

(21) Appl. No.: 13/362,286

(22) Filed: Jan. 31, 2012

(65) Prior Publication Data

US 2013/0194046 A1 Aug. 1, 2013

(51) Int. Cl.
*H03B 17/00* (2006.01)
*G04F 5/14* (2006.01)

(52) U.S. Cl.
CPC .............................. *G04F 5/14* (2013.01)
USPC .............................................. 331/94.1; 331/3

(58) Field of Classification Search
CPC ........................................................ G04F 5/14
USPC ..................................... 359/267; 331/3, 94.1
See application file for complete search history.

(56) References Cited

U.S. PATENT DOCUMENTS

| | | |
|---|---|---|
| 4,503,543 A | 3/1985 | Ljung et al. |
| 4,639,231 A | 1/1987 | Koper et al. |
| 4,670,691 A | 6/1987 | Podgorski |
| 4,740,985 A | 4/1988 | Podgorski |
| 5,056,102 A | 10/1991 | Galbrecht |
| 5,058,124 A | 10/1991 | Cameron et al. |
| 5,127,016 A | 6/1992 | Podgorski |
| 5,327,105 A | 7/1994 | Liberman et al. |
| 5,353,835 A | 10/1994 | Mills |

(Continued)

FOREIGN PATENT DOCUMENTS

| | | |
|---|---|---|
| DE | 3830149 | 3/1990 |
| EP | 2154585 | 2/2010 |
| JP | 61144613 | 2/1986 |
| WO | 2009025893 | 2/2009 |

OTHER PUBLICATIONS

European Patent Office, "Communication under Rule 71(3) EPC", "from Foreign Counterpart of U.S. Appl. No. 12/484,878", Jul. 2, 2012, pp. 1-8.

(Continued)

*Primary Examiner* — Arnold Kinkead
(74) *Attorney, Agent, or Firm* — Fogg & Powers LLC

(57) ABSTRACT

Embodiments of the present invention provide improved systems and methods for external frit mounted components on a sensor device. In one embodiment, a method for fabricating a sensor device comprises securing at least one component stack on a sensor body over at least one opening in the sensor body, wherein the at least one component stack comprises a plurality of components and applying a frit to the plurality of components in the at least one component stack and the sensor body. The method further comprises heating the frit, the at least one component stack, and the sensor body such that the frit melts and cooling the frit, the at least one component stack, and the sensor body such that the at least one component stack is secured to the sensor body.

18 Claims, 6 Drawing Sheets

(56) References Cited

U.S. PATENT DOCUMENTS

| | | | |
|---|---|---|---|
| 5,386,432 | A | 1/1995 | Ficalora et al. |
| 5,528,028 | A * | 6/1996 | Chu et al. ............... 250/251 |
| 6,194,830 | B1 | 2/2001 | Cho |
| 6,215,366 | B1 | 4/2001 | Kern et al. |
| 6,303,928 | B1 | 10/2001 | Buell et al. |
| 6,406,578 | B1 | 6/2002 | Schober et al. |
| 6,422,824 | B1 | 7/2002 | Lee |
| 6,570,459 | B1 | 5/2003 | Nathanson et al. |
| 6,670,753 | B1 | 12/2003 | Hatano |
| 6,772,630 | B2 | 8/2004 | Araya |
| 6,837,075 | B1 * | 1/2005 | Snowdon et al. ............ 65/406 |
| 6,853,135 | B1 | 2/2005 | Fritz |
| 6,900,702 | B2 | 5/2005 | Youngner et al. |
| 6,931,711 | B2 | 8/2005 | Ecklund et al. |
| 7,323,941 | B1 | 1/2008 | Happer et al. |
| 7,379,486 | B2 | 5/2008 | Lust et al. |
| 7,446,618 | B2 | 11/2008 | Koyama |
| 7,468,637 | B2 | 12/2008 | Braun et al. |
| 7,493,677 | B2 | 2/2009 | Muller |
| 7,944,317 | B2 * | 5/2011 | Strabley et al. ............ 331/94.1 |
| 7,965,147 | B2 * | 6/2011 | Strabley et al. ............ 331/94.1 |
| 8,071,019 | B2 | 12/2011 | Touchberry et al. |
| 2003/0119496 | A1 | 6/2003 | Gaal et al. |
| 2006/0022761 | A1 | 2/2006 | Abeles et al. |
| 2006/0051213 | A1 | 3/2006 | Touchberry et al. |
| 2007/0034809 | A1 | 2/2007 | Lal et al. |
| 2007/0200643 | A1 | 8/2007 | Dimarcq et al. |
| 2008/0267232 | A1 | 10/2008 | DeNatale |
| 2009/0212204 | A1 | 8/2009 | McBride |
| 2010/0033255 | A1 | 2/2010 | Strabley |
| 2010/0111750 | A1 | 5/2010 | Touchberry et al. |
| 2013/0061655 | A1 | 3/2013 | Schober et al. |

OTHER PUBLICATIONS

European Patent Office, "European Search Report", "from Foreign Counterpart of U.S. Appl. No. 13/362,286", Apr. 18, 2013, pp. 1-3, Published in: EP.
European Patent Office, "Office Action", "from Foreign Counterpart of U.S. Appl. No. 13/362,286", May 7, 2013, pp. 1-5, Published in: EP.
Schober et al., "Systems and Methods for Gettering an Atomic Sensor", "U.S. Appl. No. 13/231,438, filed Sep. 13, 2011", pp. 1-17.
Burt, "Prospects for Ultra-Stable Time Keeping With Sealed Vacuum Operation in Multi-Pole Linear Ion Trap Standards", "Precise Time and Time Interval (PTTI) Systems and Applications Meeting (39th)", Nov. 27, 2007, Publisher: National Aeronautics and Space Administration, 2008.
Iga et al, "Stacked Planar Optics: an Application of the Planar Microlens", "Applied Optics", Oct. 1, 1982, pp. 3456-3460, vol. 21, No. 19.
Oikawa et al, "Optical Trap Array Using Distributed-Index Planar Microlens", "Electronics Letters", Apr. 15, 1982, pp. 316-317, vol. 18, No. 8.
U.S. Patent and Trademark Office, "Notice of Allowance", "U.S. Appl. No. 12/484,878", Apr. 8, 2011, pp. 1-18.
European Patent Office, "European Search Report", "from Foreign Counterpart of U.S. Appl. No. 12/484,878", mailed Dec. 17, 2010, pp. 1-3, Published in: EP.
Japanese Patent Office, "Office Action", "from Foreign Counterpart of U.S. Appl. No. 12/484,878", Sep. 6, 2013, pp. 1-6, Published in: JP.
U.S. Patent and Trademark Office, "Restriction Requirement", "from U.S. Appl. No. 13/231,438", Oct. 10, 2013, pp. 1-7, Published in: US.
U.S. Patent and Trademark Office, "Office Action", "from U.S. Appl. No. 13/231,438", Dec. 19, 2013, pp. 1-28, Published in: US.

* cited by examiner

SYSTEMS AND METHODS FOR EXTERNAL FRIT MOUNTED COMPONENTS

GOVERNMENT LICENSE RIGHTS

This invention was made with U.S. government support under contract no. W31P4Q-09-C-0348 awarded by the U.S. Army. The U.S. government has certain rights in the invention.

BACKGROUND

Atomic sensors, like cold atom clocks and ring laser gyroscopes, use external components to control light and optical signals as they enter the body of the atomic sensor and to sense light and signals as they exit the body of the atomic sensor. Because the external components receive and control light and other signals, the components must be in the correct location relative to the body of the atomic sensor to accurately receive and control the light and other signals. To secure the external components in the correct location, the components are attached to the body of the atomic sensor using adhesives. Alternatively, an external mechanical structure can secure the atomic sensor and external components in the desired locations relative to one another. However, when the external components are secured using either an adhesive or an external mechanical structure, vibrations and shocks cause the components and the atomic sensor to move in relation to one another. This movement in relation to one another affects the operative quality of the sensor. Further, mounting the external components using adhesive or an external mechanical structure requires multiple steps during fabrication of the atomic sensor.

SUMMARY

The embodiments of the present invention provide systems and methods for external frit mounted components and will be understood by reading and studying the following specification.

Embodiments of the present invention provide improved systems and methods for external frit mounted components on a sensor device. In one embodiment, a method for fabricating a sensor device comprises securing at least one component stack on a sensor body over at least one opening in the sensor body, wherein the at least one component stack comprises a plurality of components and applying a frit to the plurality of components in the at least one component stack and the sensor body. The method further comprises heating the frit, the at least one component stack, and the sensor body such that the frit melts and cooling the frit, the at least one component stack, and the sensor body such that the at least one component stack is secured to the sensor body.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for externally mounting components on an atomic sensor using frit. This is accomplished by placing the external components in the correct location in relation to the body of the atomic sensor and applying frit around the external components such that when the atomic sensor, the external components and frit are heated, the frit welds the external components to each other and to the body of the atomic sensor. By using frit, the external components become rigidly attached to the body of the atomic sensor such that the external components move with the atomic sensor when the system is vibrated or shocked. Further, the external components can be joined to the body of the atomic sensor at the same time that other components are joined to the body of the atomic sensor. Because multiple components can be joined at various locations on the body of the atomic sensor simultaneously using frit, the use of frit uses less fabrication steps to join the body of the atomic sensor to the external components.

Figure 1:
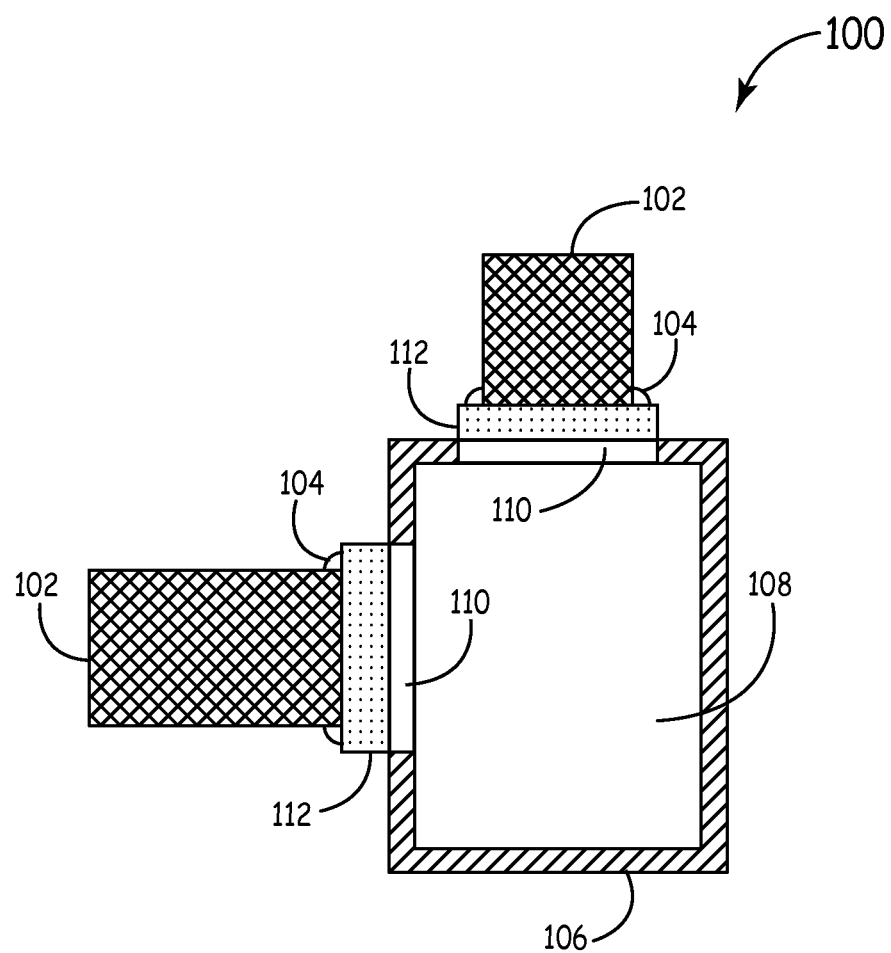
FIG. 1 is a cross section diagram illustrating externally mounted components attached with frit to a sensor body in one embodiment of the present invention.

FIG. 1 is a cross section diagram of sensor 100 where external components are attached with frit 104 to a sensor body 106 of the atomic sensor 100. Sensor 100 is an optical sensor (such as an accelerometer, a gyroscope, an atomic clock, and the like). In certain embodiments, sensor 100 includes a sensor body 106 that includes a cavity 108 that encompasses a hermetically sealed environment, where the environment type aids sensor 100 in operating correctly. For example, when sensor 100 is a ring laser gyroscope, the cavity 108 will contain a desired gas that is hermetically sealed within the sensor body 106. In an alternative implementation, where the sensor is an atomic clock, the cavity 108 encompasses a vacuum that is hermetically sealed within the sensor body 106.

In certain implementations, measurement information obtained by sensor 100 is obtained by observing patterns of optical energy contained within cavity 108. For that reason, sensor 100 provides openings 110 to allow measurement information produced within cavity 108 to be used by an external system connected to sensor 100. Openings 110 are locations on sensor body 106 that allow optical energy to leave or enter the sensor body 106, and allow an external system to analyze the patterns of optical energy within cavity 108.

As shown in FIG. 1, components that interface with sensor body 106 are combined together to form one or more component stacks 102. Sensor 100 can have multiple component stacks 102 that are associated with different openings 110 in sensor body 106. For example, when sensor 100 is an atomic clock, the sensor body 106 can have one or more openings 110 that introduce light into cavity 108 and one or more openings 110 for light to be transmitted out of cavity 108. In one exemplary embodiment of a component stack 102 associated with directing light into cavity 108, component stack 102 may include a light source (such as a laser, for example), a lens, a beam splitter (that is, a device that directs portions of light to separate openings), a beam expander, and the like. In an exemplary embodiment of a component stack 102 associated with receiving light from cavity 108, component stack 102 includes a photodetector, a lens, and the like. Further, to preserve a vacuum within the cavity 108, in one embodiment, component stack 102 includes a getter. In one embodiment where sensor 100 is a ring laser gyroscope, the component stack 102 will include a light emitting diode for starting the operation of the ring laser gyroscope. In one embodiment, openings 110 around cavity 108 may include optical elements 112 that may comprise, transparent window elements, reflective mirror elements, or elements that are partially transparent and partially reflective.

In at least one embodiment, frit 104 or glass solder is used to join the individual components in component stack 102 to each other. The word "frit," as used herein, refers to a fused or a partially fused substance that can be heated into glass. In conjunction with bonding the individual components to one another, frit 104 is also used to bond the component stack 102 to the sensor body 106. In some implementations, fit 104 is used to bond mirrors and windows 112 to sensor body 106. In some embodiments where optical elements 112 are bonded to sensor body 106, the component stack 102 is bonded to optical elements 112. For example, an optical element 112 may be bonded to the sensor body 106 using frit 104, such that the frit 104 forms a hermetic seal between the optical element 112 and the sensor body 106. In an alternative embodiment where an opening 110 does not include an optical element 112, a component stack 102 is directly joined to the sensor body 106 over an openings 110 using fit 104 to form a hermetic seal between the component stack 102 and sensor body 106.

Figure 2:
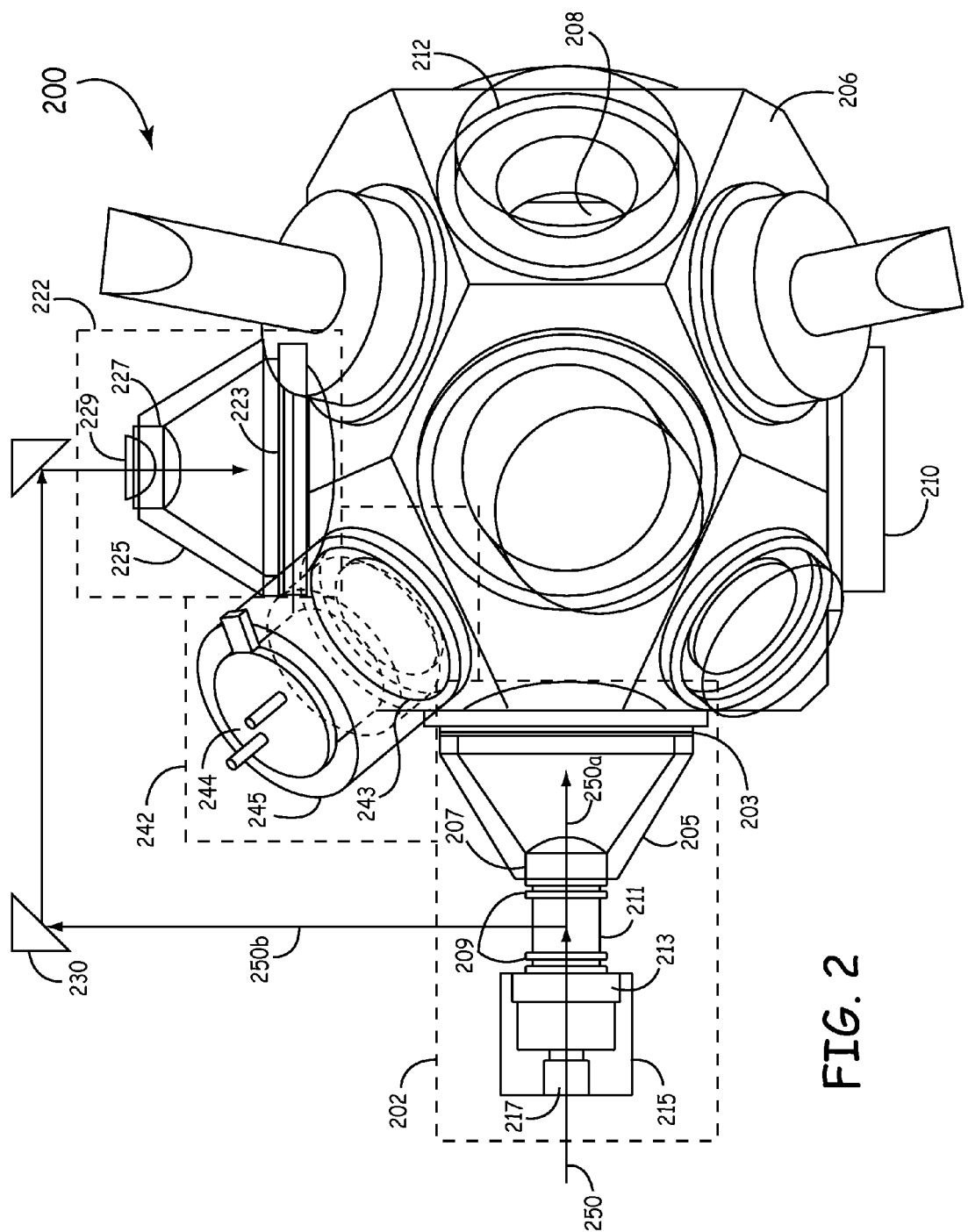
FIG. 2 is a block diagram illustrating multiple components in a component stack in one embodiment of the present invention.

By using frit 104 to join component stacks 102 (either in conjunction with optical elements 112, or not) to the sensor body 106, the components in the component stack 102 become securely bonded to the sensor body 106 such that the effects of shocks and vibrations to sensor 100 on the accuracy of sensor 100 is reduced. Further, by using frit 104 to join the components in component stack 102 to one another and the component stack 102 to the sensor body 106, the components in the sensor 100 can be located at their respective locations in relation to the sensor body 106 and bonded to one another and to the sensor body 106 simultaneously. FIG. 2 is a block diagram illustrating a sensor 200 with multiple components in multiple component stacks. In one embodiment, sensor 200 comprises a sensor 100 such as described above. As such, the description of alternate embodiments provided herein with respect to FIG. 2 may be applied to embodiments described in FIG. 1 and vice versa. In the embodiment illustrated in FIG. 2, sensor 200 is an atomic clock. Sensor 200 includes at least three component stacks, 202, 222, and 242. Component stack 202 and 222 function together to introduce light into the cavity 208 within sensor 200. Sensor 200 includes a sensor body 206 that includes a cavity 208 comprising a vacuum chamber cavity that holds alkali metal atoms such as rubidium or cesium (for example, Rb-87) in a passive vacuum. An arrangement of mirrors 210 and windows 212 allow beams of light to be directed into and around the sensor body 206, where the mirrors 210 reflect the beams around the interior of the sensor body 206. In some embodiments, the component stacks 202, 222, and 242 are directly bonded to sensor body 206 and not bonded to an interceding window 212. In other embodiments, one or more of component stacks 202, 222, and 242 may be bonded to an interceding window.

Component stack 202, 222, and 242 include lenses 203, 223, and 243. Lenses 203, 223, and 243 are each placed at their respective locations such that they abut against sensor body 206, whereupon, lenses 203, 223, and 243 are secured to the sensor body 206 using frit. By securing the lenses 203, 223, and 243 as close as possible to the sensor body 206 using frit, the lenses 203, 223, and 243 in conjunction with the frit are able to hermetically seal the interior cavity of sensor body 206 and preserve a vacuum environment within the cavity 208. In some embodiments, one or more of lenses 203, 223, and 243 are convex lenses placed against sensor body 206. In such embodiments, the convex portion of the lens may be arranged to face the interior cavity 208 of sensor body 206 so that they are able to effectively transmit from component stacks 202 and 222 and focus the light at a particular location within cavity. In one embodiment, lens 243 receives light from within sensor body 206 and focuses it onto receiving electronics 244 in component stack 242.

In one embodiment, component stack 202 includes components that receive a light beam 250 and adjust the light beam 250 before it enters the interior cavity 208 of sensor body 206. To adjust light beam 250, component stack 202 includes a collimating lens 217, an optical isolator 213, a series of wave plates 209, a beam splitter 211, and a beam expander 207. Component stack 202 also includes support structures 215 and 205 to set the various components at the appropriate distances from one another to correctly adjust the properties of light beam 250.

In operation, component stack 202 first receives the light through a collimating lens 217. Collimating lens 217 receives light beam 250 from a light source (like a laser, or other light producing device) and adjusts light beam 250 such that the rays of light that compose light beam 250 are parallel to one another. The light then leaves collimating lens 217 to enter optical isolator 213. In some embodiments, the collimating lens 217 is offset from optical isolator 213 a defined distance before the collimated light enters the optical isolator 213. To support the collimating lens 217 at the offset distance from optical isolator 213, support structure 215 attaches between collimating lens 217 and optical isolator 213. In at least the embodiment shown, support structure 215 is made from glass and rigidly connects to both collimating lens 217 and optical isolator 213 during the fabrication process. In at least one embodiment, the bonded combination of the collimating lens 217, optical isolator 213, and support structure 215 enclose a hermetically sealed chamber through which light beam 250 travels after collimation.

Optical isolator 213 allows light to travel through component stack 202 in only one direction and functions as an optical diode. After the light beam 250 passes through optical isolator 213, light beam 250 enters a beam splitter 211 and a combination of wave plates 209. As shown in the exemplary embodiment of FIG. 2, beam splitter 211 is sandwiched between two wave plates 209. The wave plates 209 alter the polarity of the light beam as it travels through component stack 202 to a desired polarity for entry into the sensor body 206. As shown, a first wave plate 209 alters the polarity of light beam 250 before it passes through beam splitter 211. Beam splitter 211 splits light beam 250 into two separate light beams 250a and 250b. Light beam 250b is reflected by beam splitter out of component stack 202 for use in an external application or for use by a different component stack such as component stack 222. In contrast to light beam 250b, light beam 250a passes through further components in component stack 202 before it passes into sensor body 206. For example, after passing through beam splitter 211, light beam 250a passes through a second wave plate 209 to further adjust the polarity of light beam 250a before light beam 250a enters into the sensor body 206.

When the polarity of light beam 250a has been adjusted by wave plates 209, light beam 250a passes through a beam expander 207 and lens 203, where lens 203 is substantially described above and forms a hermetic seal with sensor body 206. Beam expander 207 refracts the collimated and polarized light such that light beam 250a expands before passing through lens 203. To allow the refracted light beam 250a to expand, beam expander 207 is offset away from lens 203 by a distance that provides substantially enough space between beam expander 207 and lens 203 for light beam 250a to expand to a desired diameter before light beam 250a passes through lens 203. To offset beam expander 203 from lens 207, a support structure 205 rigidly bonds to both lens 203 and beam expander 207. In one implementation, support structure 205 is fabricated from glass and bonds to both beam expander 207 and lens 203 using a frit seal. In one implementation, the frit seal bonding support structure 205 to beam expander 207 and lens 203 is a hermetic seal to prevent foreign substances from entering the space within support structure 205 and interfering with light beam 250a. After passing through lens 203, light beam 250a is reflected by a series of mirrors 210 to direct the light at a group of atoms in the middle of the sensor body 206.

In one embodiment, light beam 250b, which is reflected out of component stack 202 by beam splitter 211, is reflected by one or more mirrors 230 to enter component stack 222. Component stack 222 includes wave plate 229, beam expander 227, and lens 223. In one embodiment, the components in component stack 222 are supported by support structure 225. The different components in component stack 222 function similarly to corresponding components in component stack 202. For example, wave plate 229 functions similarly to the second wave plate in wave plates 209, beam expander 227 functions similarly to beam expander 207, lens 223 functions similarly to lens 203, and support structure 225 functions similarly to support structure 205. The different locations of component stacks 202 and 222 on the external surface of sensor body 206 aid in providing different beams of light that are reflected by mirrors 210. For example, mirrors 210 reflect light beams 250a and 250b in such a way that different reflected light beams within sensor body 206 intersect along three orthogonal axes while illuminating atoms located at the center of cavity 208.

As described above, sensor 200 includes component stack 242 which includes a photodetector 244 and a lens 243. In some instances, where light is reflected out of the cavity 208 by a mirror 210, that light is reflected to component stack 242. Component stack 242 also includes a support structure 245 to hold photodetector 244 at a prescribed distance from lens 243. Support structure 245 functions similarly to the other support structures 225 and 205 in component stacks 202 and 222. Specifically, support structure 225 functions to place space between optical components while bonding to the optical components. Support structure 225 can also bond to both photodetector 244 and lens 243 with a fit seal. Further, the frit seal that bonds support structure 225 to photodetector 244 and lens 243 hermetically isolates the space between photodetector 244 and lens 243.

As described above, component stacks 202, 222, and 242 each include multiple components that are placed at precise locations in relation to sensor body 206 to allow light to correctly propagate in, around, and out of sensor body 206. The components in component stacks 202, 222, and 242 are bonded together and to sensor body 206 using frit to rigidly maintain the precise location of the components in relation to the sensor body 206. The use of fit to bond the components in component stacks 202, 222, and 242 to the sensor body 206 reduces the movement of the components in relation to the sensor body 206 during the operation of the sensor 200. By reducing the movement of the components in relation to sensor 200, the use of fit to bond the components within component stacks 202, 222, and 242 together and to bond the component stacks 202, 222, and 242 to sensor body 206 also reduces errors in measurements by sensor 200 due to reduced movement of the components in relation to the sensor body 206.

Figure 3:
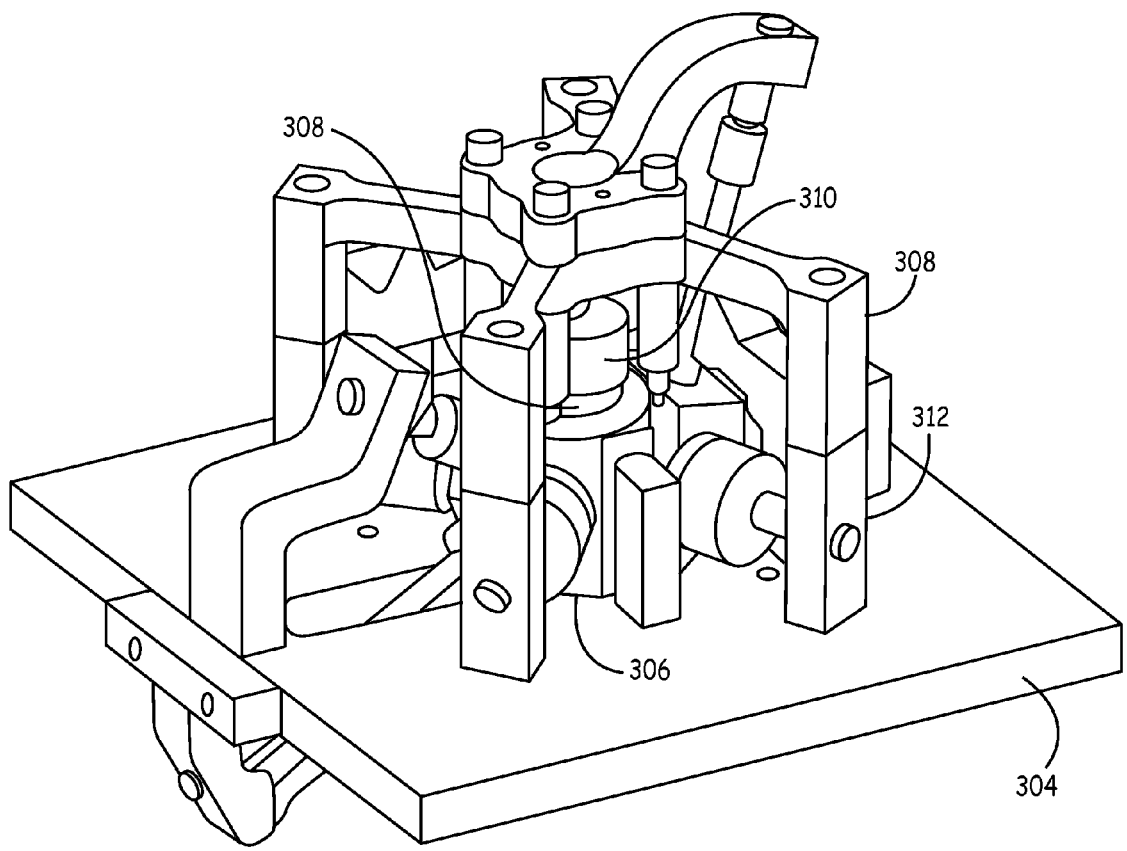
FIG. 3 is a block diagram illustrating a fixture for securing a component stack to a sensor body in one embodiment of the present invention.

FIG. 3 is a block diagram illustrating a fixture 304 for securing a component stack 302 (such as any of sensor stacks 102, 202, 222, or 242) to a sensor body 306 (such as sensors body 106 or 206). As was stated above, one advantage of using a fritting process is that all of the various components of the sensor can be bonded to the sensor body 306 at the same time. To bond the various components in the component stack 302, mirrors, windows, and the like to sensor body 306, sensor body 306 is mounted within a fixture 304. The term "fixture," as used herein, refers to a rigid structure that holds components in a precise location during fabrication. For example, when the sensor body 306 is mounted within the fixture 304, the fixture holds the components at a desired location in relation to the sensor body 306. In one embodiment, fixture 304 uses plungers 310 to hold the different components of component stack 302 in place. In another exemplary implementation, fixture 304 is composed of multiple parts that are assembled together at the time the sensor body 306 and components are assembled together. For example, fixture 304 has a top portion 308 that is secured to a lower portion 312 of fixture 304 after the sensor body 306 has been placed within fixture 304. Fixture 304 secures all the components to sensor body such that frit can be applied to the multiple components and the sensor body. Further, fixture 304, the components, sensor body 306, and the frit joining the sensor body 306 and the components can be heated at the same time such that the frit simultaneously bonds all the assembled pieces held in place by fixture 304. When the frit has bonded the various components to the sensor body 306, the sensor body 306 and adjoining components are removed from fixture 304.

Figure 4:
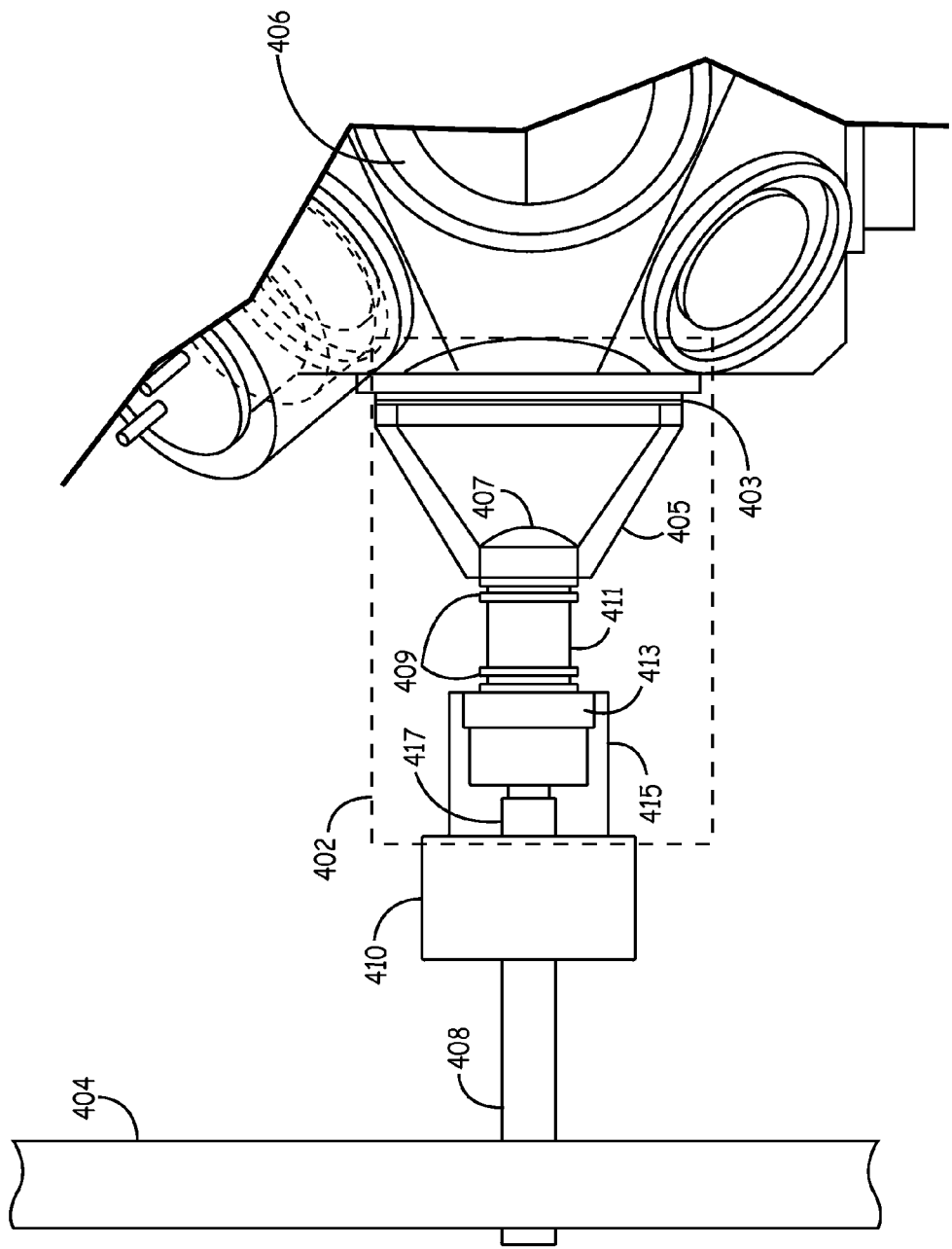
FIG. 4 is a block diagram illustrating a detailed view of the fixture when securing a component stack to a sensor body in one embodiment of the present invention.

FIG. 4 is a block diagram illustrating a detailed view of a fixture 404 when securing a component stack 402 (such as component stack 302) to a sensor body 406 (such as body 306). When component stack 402 is secured to sensor body 406, the various components in sensor body 406 are first prepped for assembly by cleaning the separate components. When the different components in component stack 402 are ready for assembly to sensor body 406, the different pieces are placed together one by one onto sensor body 406. In at least one embodiment, sensor body 406 and fixture 404 are rotated such that sensor body 406 is directly below component stack 402. By orienting sensor body 406 below component stack 402, gravity can aid in the stacking of the different components in component stack 402 before the components are secured in place with a plunger 410 connected to fixture 404.

In certain embodiments, when the component stack 402 is substantially similar to component stack 202 described in FIG. 2, in the assembly of component stack 402, a lens 403 is fitted into sensor body 406. The other components in component stack 402 are then subsequently stacked on top of one another as the components move away from sensor body 406. For example, support structure 405 is placed on the lens, the beam expander 407 is then placed on the support structure 405, the second wave plate 409 is placed on the beam expander 407, the beam splitter 411 is placed on the second wave plate 409, and the first wave plate 409 is placed on the beam splitter 411. Further, the optical isolator 413 is placed on the first wave plate 409, a support structure 415 is placed on optical isolator 413, and a collimating lens 417 is placed on support structure 415. When all the components in component stack 402 are placed on top of one another, a plunger 410 is then placed on collimating lens 417 and support structure 415 to secure component stack 402 to sensor body 406.

When the components of component stack 402 are in place and secured to sensor body 406, frit is applied to the component stack 402 to join the different components in component stack 402 together. In one embodiment, frit is applied to hermetically seal the space between components. Alternatively, frit is also applied to the different components such that the components are bonded to one another but the space between the different components is not hermetically sealed. The frit is then heated and cooled to bond the different components together. When the different components in component stack 402 are bonded to one another through the frit, the plunger 410 in fixture 404 is removed and the sensor is removed from fixture 404.

Figure 5:
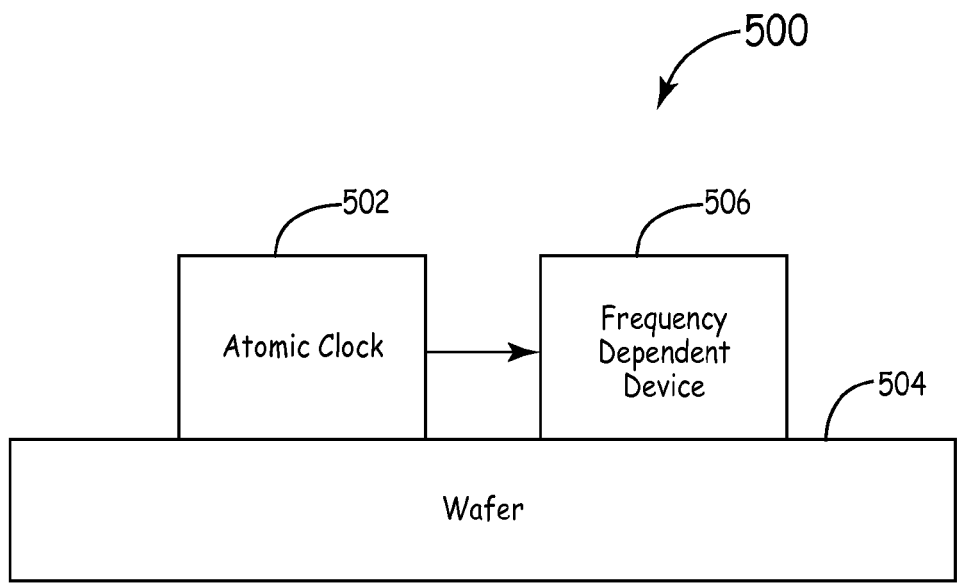
FIG. 5 is a block diagram showing an exemplary implementation of an atomic clock in one embodiment of the present invention.

In certain embodiments, as has been described above, the atomic sensor is an atomic clock. The use of frit enables the manufacture of atomic clocks that can be manufactured in fewer steps and are less susceptible to errors caused by vibrations and shocks. Further, the atomic clocks described above can be used to provide a reference frequency signal to frequency dependent applications as part of Global Positioning System satellites, unmanned aerial vehicles, navigation systems, and the like. FIG. 5 illustrates the implementation of an atomic clock 502 in a system 500. In certain embodiments, atomic clock 502, constructed implementing the fritted component stacks as described above, is small enough to be used in micro-electromechanical systems (MEMS). For example, atomic clock 502 is mounted as part of a MEMS device 504. Atomic clock 502 produces a reference frequency and provides the reference frequency to a frequency dependent device 506. The reference frequency provided by atomic clock 502 increases the operational stability and accuracy of frequency dependent device 506. For example, when frequency dependent device 506 is a component of a Global Positioning System satellite, the atomic clock 502 allows the satellite to provide more accurate reference times for the accurate calculation of positions.

Figure 6:
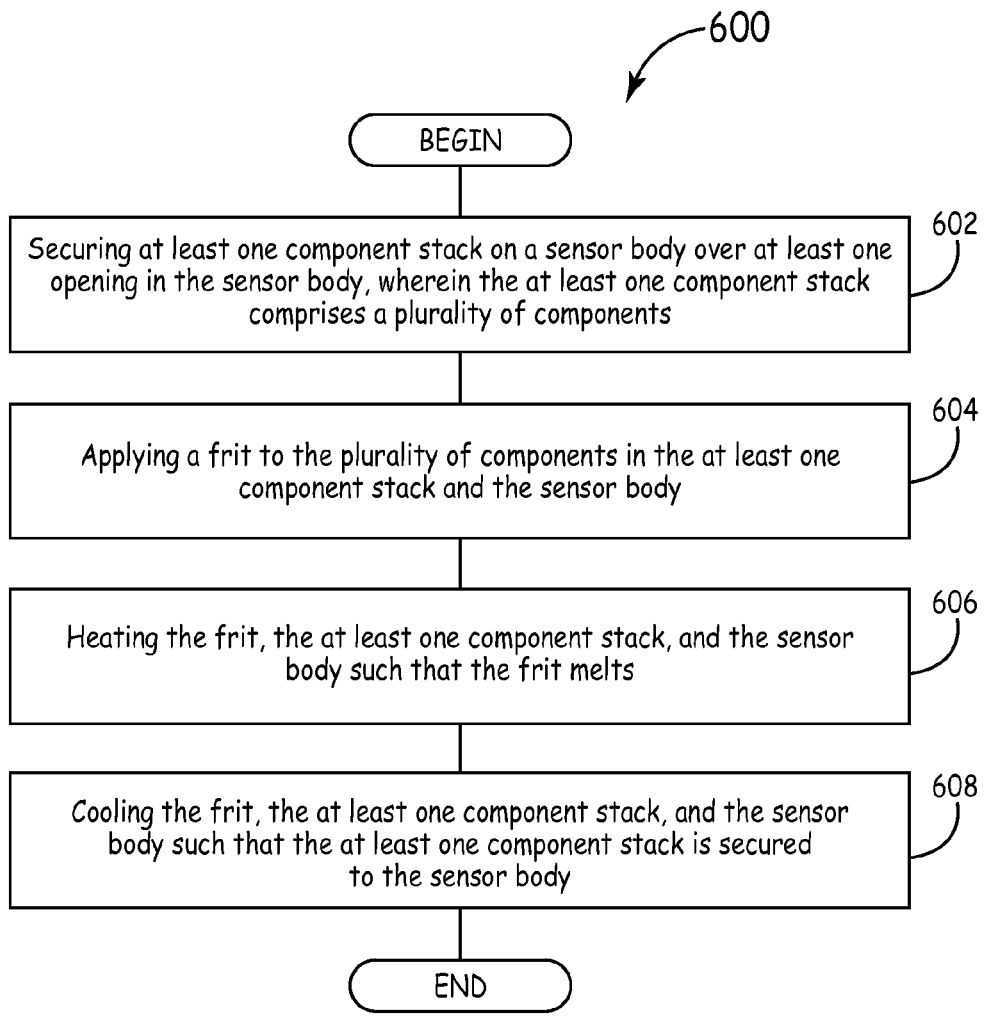
FIG. 6 is a flow diagram illustrating a method for attaching externally mounted components to a sensor body using frit in one embodiment of the present invention.

FIG. 6 is a flow diagram illustrating a method 600 for attaching externally mounted components to a sensor body using frit. Method 600 begins at 602 with securing at least one component stack on a sensor body over at least one opening in the sensor body, wherein the at least one component stack comprises a plurality of components. In one embodiment, the opening includes an optical element such as a window or mirror over the opening. In such embodiments, the component stack is secured over the optical element. In one embodiment, as described above in relation to FIGS. 3 and 4, a fixture secures a component stack comprising a plurality of different components to a sensor body. The fixture includes a rigid frame that secures the positions of both the component stack and the sensor body at fixed positions in relation to each other. In one embodiment, the fixture includes a plunger that applies pressure against the component stack, which pressure secures the component stack to the sensor body.

Method 600 proceeds at 604 with applying a frit to the plurality of components in the at least one component stack and the sensor body. In one example, frit is applied around the opening in the sensor body and the adjoining component stack. Further, frit is applied around the different components in the component stack. In one embodiment, frit is applied to a window or mirror over and opening in the sensor body and the adjoining component stack.

Method 600 proceeds at 606 with heating the frit, the at least one component stack, and the sensor body such that the frit melts. For example, a fixture that secures the component stacks to the sensor body is passed through an oven that gradually heats frit on the sensor body and component stacks to a frit melting temperature. (For example, the oven heats the frit to 420° Celsius). At this temperature, the frit will melt and bond to the adjoining surfaces. Method 600 proceeds at 608 with cooling the frit, the at least one component stack, and the sensor body such that the component stack is secured to the sensor body. For example, the sensor body and component stack within the fixture is gradually cooled to prevent the sensor body and components from cracking due to a rapid temperature change. When the frit cools, the component stack will be rigidly bonded to the sensor body. And the sensor body and connected component stack can be removed from the fixture.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A sensor device, the device comprising:
 a sensor body, the sensor body comprising a cavity, wherein the sensor body comprises a plurality of openings in the body providing access to the cavity; and
 one or more component stacks mounted to the sensor body over one or more openings in the plurality of openings using a frit, wherein a component stack in the one or more component stacks comprises a plurality of components that are attached to one another with the frit, wherein one or more optical elements are attached with the frit to the one or more openings such that the frit and the one or more optical elements hermetically seal the cavity within the sensor body, wherein the one or more component stacks are attached to the one or more optical elements with the frit.

2. The device of claim 1, wherein the plurality of components comprises at least one of:
 an optical component, a structural support, a sensor, or an electronics device.

3. The device of claim 1, wherein the component stack is mounted to an opening in the plurality of openings of the sensor body with a frit seal such that the frit seal between the component stack and the sensor body hermetically seals the opening to the sensor body.

4. The device of claim 1, wherein the sensor device comprises at least one of:

an atomic clock; and
a ring laser gyroscope.

5. The device of claim 1, wherein the plurality of components in the component stack are hermetically sealed to one another.

6. A method for fabricating a sensor device, the method comprising:
  attaching one or more optical elements to one or more openings on a sensor body, wherein each optical element in the one or more optical elements is associated with an opening in the one or more openings;
  securing one or more component stacks on the sensor body over the one or more openings in a plurality of openings in the sensor body, wherein the one or more component stacks comprise a plurality of components, wherein the one or more component stacks are mounted to the one or more optical elements;
  applying a frit to the plurality of components in the one component stacks the one or more optical elements, and the sensor body;
  heating the frit, the one or more component stacks, and the sensor body such that the frit melts; and
  cooling the frit, the one or more component stacks, and the sensor body such that the one or more component stacks is secured to the sensor body and the one or more optical elements hermetically seals a cavity within the sensor body.

7. The method of claim 6, wherein the one or more component stacks is secured to the sensor body using a fixture, wherein a fixture comprises a device that securely maintains the one or more component stacks and the sensor body at fixed positions in relation to one another.

8. The method of claim 7, wherein the fixture comprises at least one plunger to secure the one or more component stacks to the sensor body.

9. The method of claim 7, further comprising separating the sensor body and the one or more component stacks from the fixture.

10. The method of claim 6, wherein securing the at least one component stack on the sensor body further comprise
  securing the at least one component stack and the at least one optical element to the sensor body.

11. The method of claim 10, wherein the one or more optical elements comprise at least one of either a mirror or a window, the method further comprising:
  applying the frit around the one or more optical elements such that the frit will form a hermetic seal around the opening when the frit is heated and cooled.

12. The method of claim 6, wherein the frit applied to the plurality of components and the sensor body is applied such that the frit will form a hermetic seal around the at least one opening when the frit is heated and cooled.

13. The method of claim 7, wherein heating the frit, the one or more component stacks, and the sensor body comprises gradually heating the frit, the one or more component stacks, and the sensor body to a frit melting temperature.

14. A system for providing a reference frequency, the system comprising:
  an atomic clock, the atomic clock configured to produce a reference frequency signal, wherein the atomic clock comprises:
    a clock body comprising a cavity, wherein light is introduced into the cavity through a plurality of openings in the clock body; and
    one or more component stacks mounted to the clock body over one or more openings in the plurality of openings using a glass frit, wherein a component stack in the one or more component stacks comprises a plurality of optical components that are attached to one another with the glass frit, wherein the plurality of optical components control light before it enters the cavity and after it leaves the cavity, wherein one or more optical elements are attached with the frit to the one or more openings such that the frit and the one or more optical elements hermetically seal the cavity within the clock body, wherein the one or more component stacks are attached to the one or more optical elements with the frit.

15. The system of claim 14, wherein a first component stack in the one or more component stacks comprises components that adjust a received light beam before the light beam enters the cavity.

16. The system of claim 15, wherein a component in the first component stack splits the received light beam into a first part and second part, wherein the second part is reflected into a second component stack in the one or more component stacks.

17. The system of claim 16, wherein the first component stack and the second component stack are positioned on the clock body such that the first part and the second part of the light beam are orthogonal to one another when the first part and the second part of the light beam enter the cavity.

18. The system of claim 14, wherein the plurality of optical components in a respective component stack in the one or more component stacks are hermetically sealed to one another.

* * * * *